(12) United States Patent
Ahn et al.

(10) Patent No.: US 10,409,220 B2
(45) Date of Patent: Sep. 10, 2019

(54) OPTICALLY TRAPPED ATOM TRANSFER TWEEZER THROUGH HOLOGRAM AND METHOD USING THE SAME

(71) Applicant: Korea Advanced Institute of Science And Technology, Daejeon (KR)

(72) Inventors: Jaewook Ahn, Daejeon (KR); HyoSub Kim, Daejeon (KR); Woojun Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/482,082

(22) Filed: Apr. 7, 2017

(65) Prior Publication Data

US 2018/0101134 A1 Apr. 12, 2018

(30) Foreign Application Priority Data

Oct. 7, 2016 (KR) .................. 10-2016-0129472

(51) Int. Cl.
*G03H 1/08* (2006.01)
*G03H 1/00* (2006.01)
*G03H 1/22* (2006.01)

(52) U.S. Cl.
CPC ............. *G03H 1/0005* (2013.01); *G03H 1/08* (2013.01); *G03H 1/2205* (2013.01); *G03H 1/2294* (2013.01); *G03H 2001/0077* (2013.01); *G03H 2001/221* (2013.01);
(Continued)

(58) Field of Classification Search
CPC .......... G02B 5/32; G03H 1/00; G03H 1/0005; G03H 2001/005; G03H 2001/0077; G03H 1/08; G03H 1/16

USPC ...... 359/1, 9, 10, 11, 15, 19, 29, 32, 33, 35, 359/566; 250/251; 349/201, 202
See application file for complete search history.

(56) References Cited

U.S. PATENT DOCUMENTS 7,133,203 B2 * 11/2006 Grier .................. G02B 21/32
359/566

FOREIGN PATENT DOCUMENTS

EP 2492921 A1 * 8/2012 ............. G01B 9/021

OTHER PUBLICATIONS

Lee, W. et al. "Three-dimensional rearrangement of single atoms using actively controlled optical microtraps." Optics Express, vol. 24, No. 9, 2016 (10 pgs.).

* cited by examiner

Primary Examiner — Arnel C Lavarias
(74) Attorney, Agent, or Firm — Foley & Lardner LLP

(57) ABSTRACT

An optically trapped atom transfer tweezer includes an optical modulator which modulates incident light and generates a first hologram; a first lens which images the first hologram on an intermediate image plane and generates a first holographic image having any potential shape; a second lens which re-images the first holographic image on an entrance pupil of a third lens; the third lens which re-images a second hologram generated by the re-imaging of the second lens on a plane where an optically trapped atom array exists; a photographing device which captures optically trapped cold atoms from a second holographic image generated on the plane where an optically trapped atom array exists; and a controller which controls the optical modulator to adjust the second holographic image on the basis of the optically trapped atom image captured by the photographing device such that the optically trapped atom array is transferred to any spatial position.

12 Claims, 9 Drawing Sheets

(52) U.S. Cl.
CPC . *G03H 2001/2244* (2013.01); *G03H 2210/55* (2013.01); *G03H 2225/12* (2013.01); *G03H 2226/11* (2013.01)

Hologram 1  in-between  Hologram 2

OPTICALLY TRAPPED ATOM TRANSFER TWEEZER THROUGH HOLOGRAM AND METHOD USING THE SAME

CROSS REFERENCE TO RELATED APPLICATIONS

This application claims priority to Korean Application No. 10-2016-0129472 filed Oct. 7, 2016, the disclosure of which is hereby incorporated by reference in its entirety.

BACKGROUND

Field

The present disclosure relates to an optically trapped atom transfer tweezer through a hologram and a method using the same, and more particularly to a tweezer which optically traps a low temperature single-atom array by using a holographic technique and then transfers the optically trapped atom array to any spatial position by using the holographic technique.

Description of the Related Art

In the field of quantum computation using cold neutral atoms, it is very important to trap quantum system neutral atoms at a particular position. Also, only when the cold neutral atom is maintained isolated from the outside by being placed in an ultra-high vacuum environment, quantum state coherence can be maintained. Accordingly, a technology called optical trapping which satisfies such two conditions is being much used.

The optical trapping of the cold neutral atom uses a potential change which is applied to the neutral atom by light. The potential proportional to the intensity of the light affects the neutral atoms. Therefore, when the light is focused with a small radius of approximately 1 µm, in the case of an attractive potential, a single atom may be trapped in the area where the light is focused. A low temperature state is necessarily required because the intensity of the potential is less than several mK.

An optical standing wave, i.e., one of the optical trapping technology, generates a periodic potential by using an interference effect of a coherent laser beam and then traps the single atoms, thereby forming the single-atom array. Furthermore, by causing the frequencies of mutual interfering light beams to be slightly different from each other, it is possible to transfer the atoms in a straight line direction.

However, it is much difficult to transfer the trapped atom array to any position by using various conventional technologies.

SUMMARY

One embodiment is an optically trapped atom transfer tweezer including: an optical modulator which modulates incident light and generates a first hologram; a first lens which images the first hologram on an intermediate image plane and generates a first holographic image having any potential shape; a second lens which re-images the first holographic image on an entrance pupil of a third lens; the third lens which re-images a second hologram generated by the re-imaging of the second lens on a plane where an optically trapped atom array exists; a photographing device which captures optically trapped cold atoms from a second holographic image generated on the plane where an optically trapped atom array exists; and a controller which controls the optical modulator to adjust the second holographic image on the basis of the optically trapped atom image captured by the photographing device.

The photographing device may be an electron multiplying charge-coupled device (EMCCD).

The optical modulator may be a liquid crystal spatial light modulator (LCSLM).

The optical modulator may be comprised of an array of 1920×1080 pixels, each of which has a size of 8 µm².

A focal length of the first lens and a focal length of the second lens may be 200 mm.

The third lens may be an objective lens having a focal length of 4 mm.

The second holographic image may have a beam radius $\omega_o$ of 1.14 µm, a trap depth U of 1.4 mK, and an optical power $P_0$ of 3.4 mW.

Another embodiment is a method for transferring optically trapped atoms. The method includes: modulating incident light and generating a first hologram; imaging the first hologram on an intermediate image plane and generating a first holographic image having any potential shape; first re-imaging the first holographic image; second re-imaging a second hologram generated by the first re-imaging on a plane where an optically trapped atom array exists; and capturing optically trapped cold atoms from a second holographic image generated on the plane where an optically trapped atom array exists.

The method may further include adjusting the second holographic image on the basis of the optically trapped atom image generated by the capturing.

DETAILED DESCRIPTION

Figure 1A:
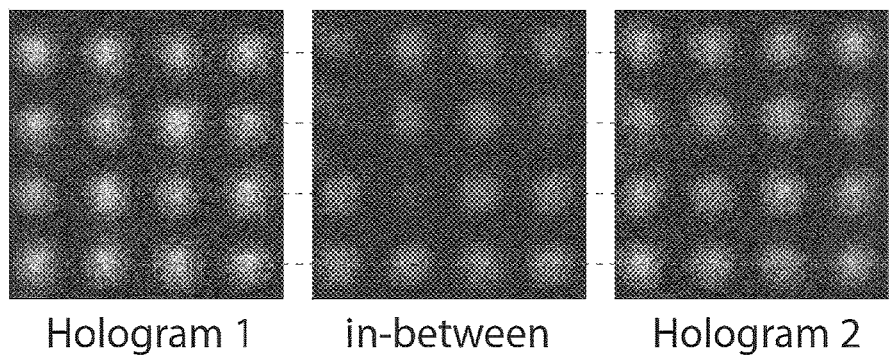
FIGS. 1a to 1c are views showing a simulation of trap loss caused by intensity flicker.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment.

Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Figure 1B:
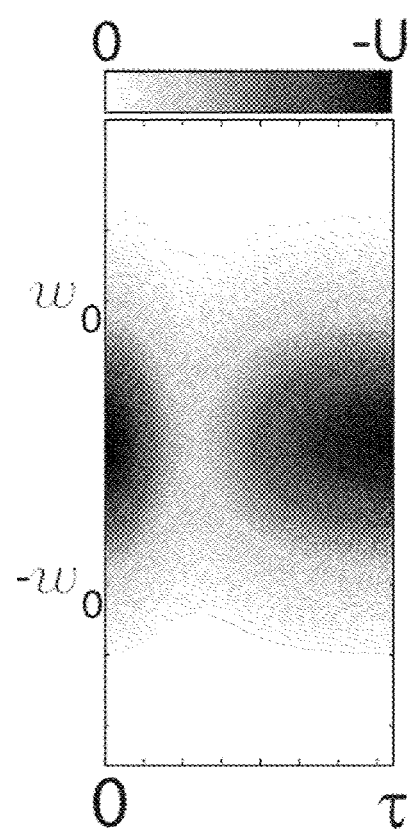
Figure 1C:
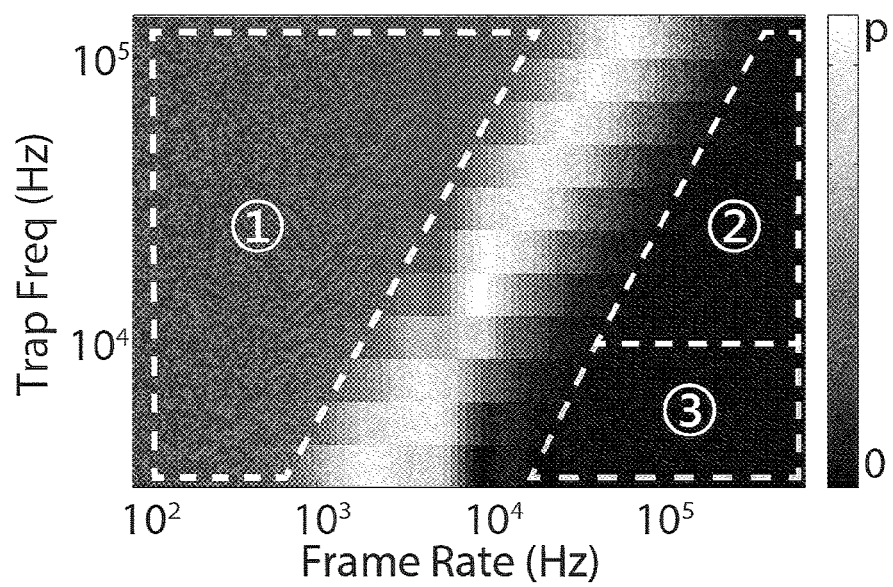

Hereinafter, the embodiment of the present invention will be described in detail with reference to the accompanying drawings. FIGS. 1a to 1c are views showing a simulation of trap loss caused by intensity flicker.

Specifically, Fig. 1a shows an optical image of an optically trapped atom array formed by an optically trapped atom transfer tweezer according to the embodiment of the present invention. Through a comparison of a first frame (Hologram 1) and a second frame (Hologram 2) of FIG. 1, it can be seen that columns in the upper two rows have been slightly shifted up. Meanwhile, the figure (in-between) shown in the middle of FIG. 1a is a photo captured during the change from the first frame to the second frame.

FIG. 1b is a view showing a transient potential which is used by the trap loss simulation, where a trap waist $\omega_0$ is 1.14 μm, a transient time $\tau$ is 1/f (f is a frame rate), and a displacement is $\omega_0/18$.

Meanwhile, FIG. 1c shows Classical Monte Carlo simulation results. This shows the trap loss landscape induced by the intensity flicker, where a color scale normalized by p represents a loss probability at time $\tau$, the p has a value of from 0.005 to 0.04 in accordance with an initial trap condition (T/U=1/18~1/12).

A holographic optical tweezer has been known to be unable to sustain the optically trapped atoms while the hologram is being updated. The intensity flicker has been pointed out as a reason for that. Although an individual hologram generated by iterative Fourier transformation algorithms (IFTA) generates a required optical potential, it is not guaranteed that the frame-to-frame evolution maintains a proper in-between potential (see FIG. 1a). Such intensity flickering is significant and irregular over the entire range of the optical potential.

Even with a fast device such as a digital micromirror device (DMD, 50 kHz frame), a large portion of the trapped atoms get lost. The trap loss simulation which is performed as a function of trap frequency $f_r = 1/2\pi\sqrt{4U\hbar no_1^2}$ where, m is single atom mass and f is a frame rate of the device, shows that the intensity flickering hinders the trap stability (see FIG. 1c).

In particular, a constant portion of loss exists in an adiabatic region ($f_r \gg f$, region ① in FIG. 1c). Single steps do not lose atoms in a non-adiabatic region ($f_r < f$). However, in this region, either the atoms boil up fast by displacement heating (region ③ in FIG. 1c), or current technologies are not applicable (region ② in FIG. 1c). Therefore, there is a necessity for an alternative algorithm for transferring the holographic single atoms.

Figure 2:
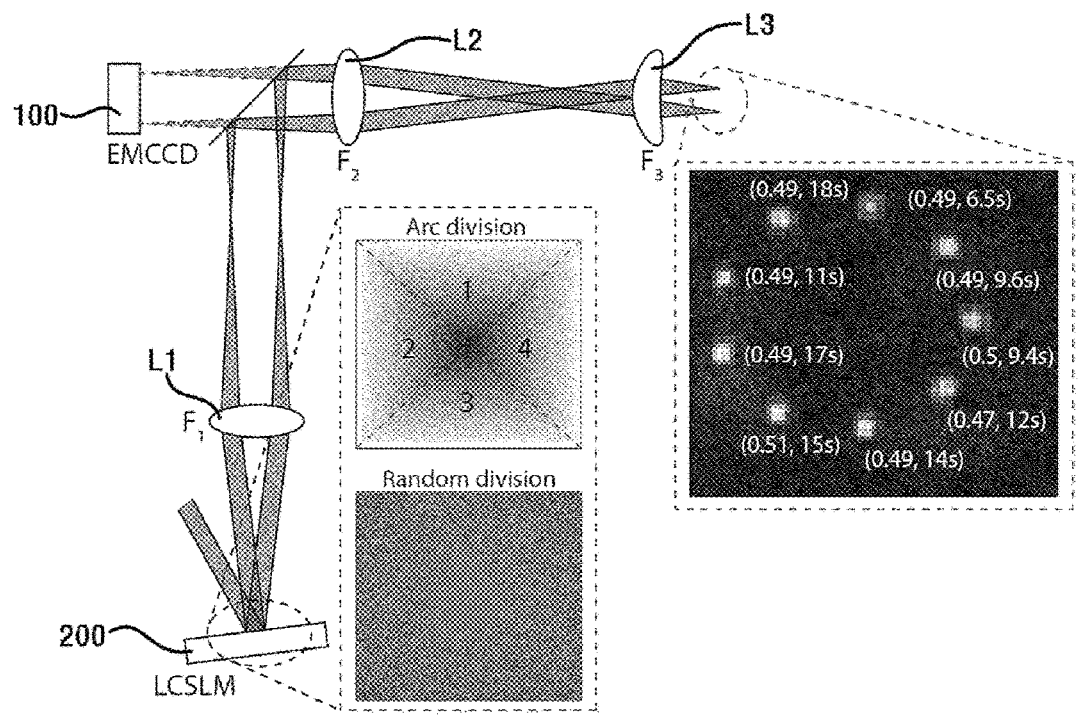
FIG. 2 is a view showing a configuration of an optically trapped atom transfer tweezer according to an embodiment of the present invention.

FIG. 2 is a view showing a configuration of the optically trapped atom transfer tweezer according to the embodiment of the present invention. As shown in FIG. 2, the optically trapped atom transfer tweezer according to the embodiment of the present invention includes a photographing device 100, an optical modulator 200, and a controller (not shown) controlling them.

The photographing device 100 may be an electron multiplying charge-coupled device (EMCCD). The EMCCD is a recording device which uses accumulation and transfer of electric charges and has a function to capture a below-described holographic image.

The optical modulator 200 may be a liquid crystal spatial light modulator (LCSLM) and corresponds to a holographic device. The optical modulator 200 is comprised of a reflective phase modulator array of 1920×1080 pixels. Each pixel may have a size of 8 μm² and may have a first order diffraction efficiency equal to or less than 50%. However, there is no limitation to this.

A diffracted beam from the spatial light modulators (SLM) is imaged onto an intermediate image by a first lens L1 having a focal length $F_1$ of 200 mm, and then is re-imaged onto a focal plane of an objective lens L3 by a second lens having a focal length $F_2$ of 200 mm. The given $2F_1$-$2F_2$ geometry from the SLM efficiently transfers the holograms to a final image plane in an experimental chamber.

The objective lens L3 may have a focal length $F_3$ of 4 mm, numerical aperture (NA) of 0.5, and a long working distance of 16 mm with 3.5 mm-thick glass-plate compensation. However, there is no limitation to this.

The optical tweezers produced on the final image plane may have a beam radius $\omega_o$ of 1.14 μm, a trap depth U of 1.4 mK, and an optical power $P_0$ of 3.4 mW per tweezer. When a given laser power of 1.1 W is able to sustain up to nine optical tweezers in consideration of loss of the optical path and the efficiency of a random division algorithm.

Referring back to FIG. 2, the light is modulated by the optical modulator 200, is reflected through the first lens L1, and then generates an image on the second lens L2. Then, the image which has passed through the second lens L2 passes through the objective lens L3 and generates a final holographic image. The photographing device 100 captures the optically trapped atomic signal on the thus generated image. The controller (not shown) controls the optical modulator 200 on the basis of the image generated by the photographing device 100, so that the holographic images for transferring the atom array are sequentially generated.

The area of optical modulator 200 of FIG. 2 may be divided by using an arc division method or may be divided by using a random division method. However, it is preferable to use the random division method because the random division method generates more regular intensity. Therefore, the optical modulator 200 which is used in the optically trapped atom transfer tweezer according to the embodiment of the present invention uses the random division method.

In the simulation, nine atoms are transferred by using the hologram finally generated through the third lens L3. This is shown in FIG. 2. However, the optically trapped atom transfer tweezer according to the embodiment of the present invention is able to transfer a greater or smaller number of the optically trapped atoms than nine atoms.

Figure 3:
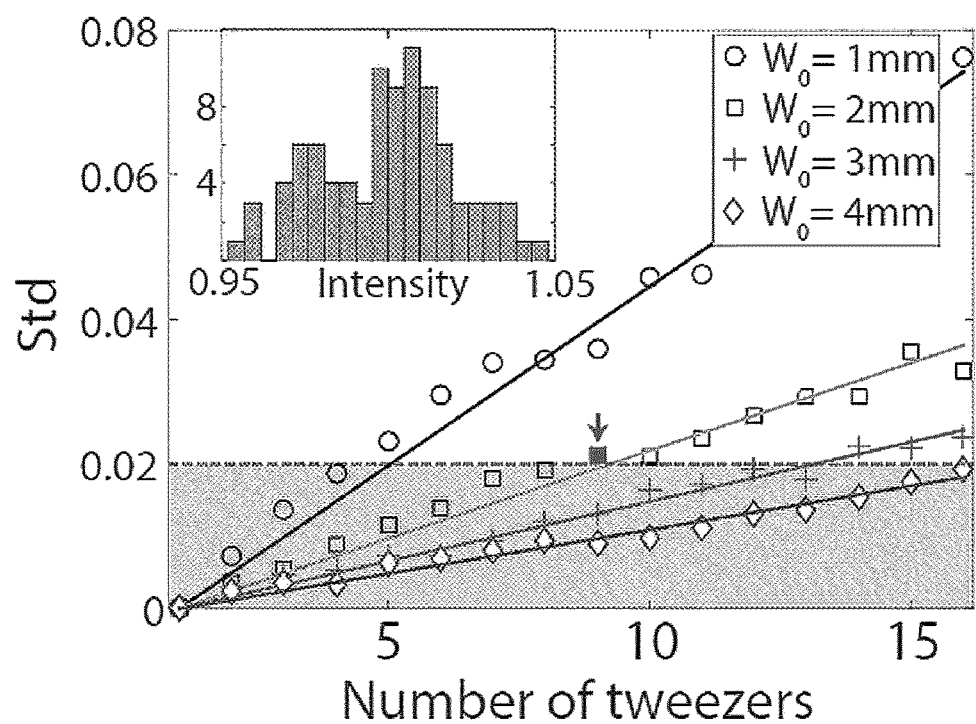
FIG. 3 is a graph of relative intensity standard deviation (y-axis) of each tweezer with respect to the number (x-axis) of the optical tweezers, i.e., a holographic image.

FIG. 3 is a graph of relative intensity standard deviation (y-axis) of each tweezer with respect to the number (x-axis) of the optical tweezers, i.e., a holographic image.

Specifically, FIG. 3 shows the respective radii (W=1 to 4 mm) of the light incident on the optical modulator. The smaller the standard deviation is, the more uniform tweezer heat is generated, so that the upper limit of transfer loss is reduced. The number of the tweezers is limited by the power of the light, and the radius of the incident light is limited by the pupil size of the objective lens. For example, FIG. 3 shows an intensity histogram in the case where nine tweezers and the light with a radius of 2 mm are used.

Figure 4:
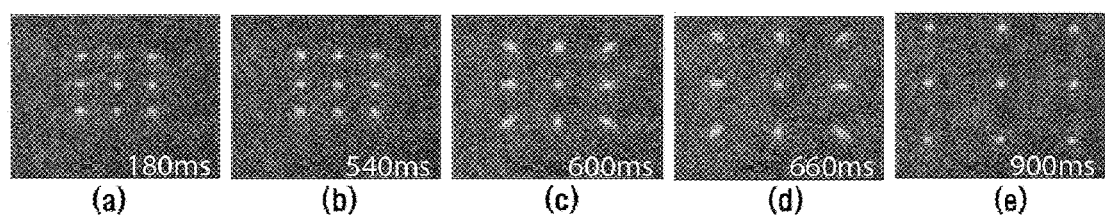
FIG. 4 is a view showing an atom array rearrangement process by the optically trapped atom transfer tweezer according to the embodiment of the present invention.

FIG. 4 is a view showing an atom array rearrangement process by the optically trapped atom transfer tweezer according to the embodiment of the present invention. It can be seen that, due to the holographic image which shows that the atom array arranged as shown in (a) of FIG. 4 is changed by the optical modulator 200, the intervals between the atoms are increased with the lapse of time. In this simulation, while the distance d between the atoms in (a) of FIG. 4 is 4.4 µm, the distance d is increased double in 900 ms (see (e) of FIG. 4).

Figure 5:
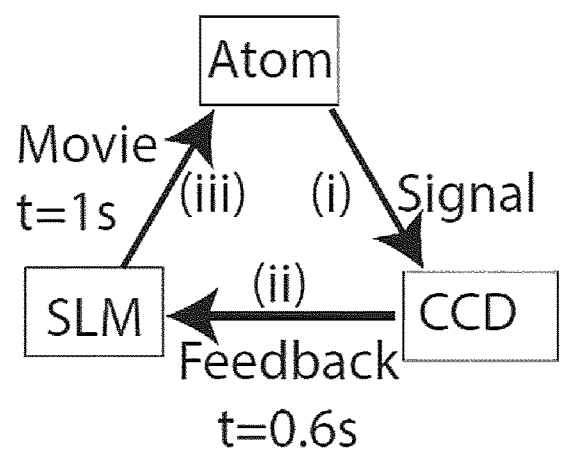
FIG. 5 is a view for describing the operation of the optically trapped atom transfer tweezer according to the embodiment of the present invention.

FIG. 5 is a view for describing the operation of the optically trapped atom transfer tweezer according to the embodiment of the present invention. FIG. 5 shows a feedback control loop by the controller (not shown). That is, when the optical modulator 200 generates the holographic image at time is and transfers the atoms, the photographing device 100 captures the image and controls the optical modulator 200 again on the basis of the captured image, and thus, generates an image having a different potential and then transfers the atoms. Such a process is continually repeated, so that the atom is transferred to a desired position by a desired distance.

Figure 6:
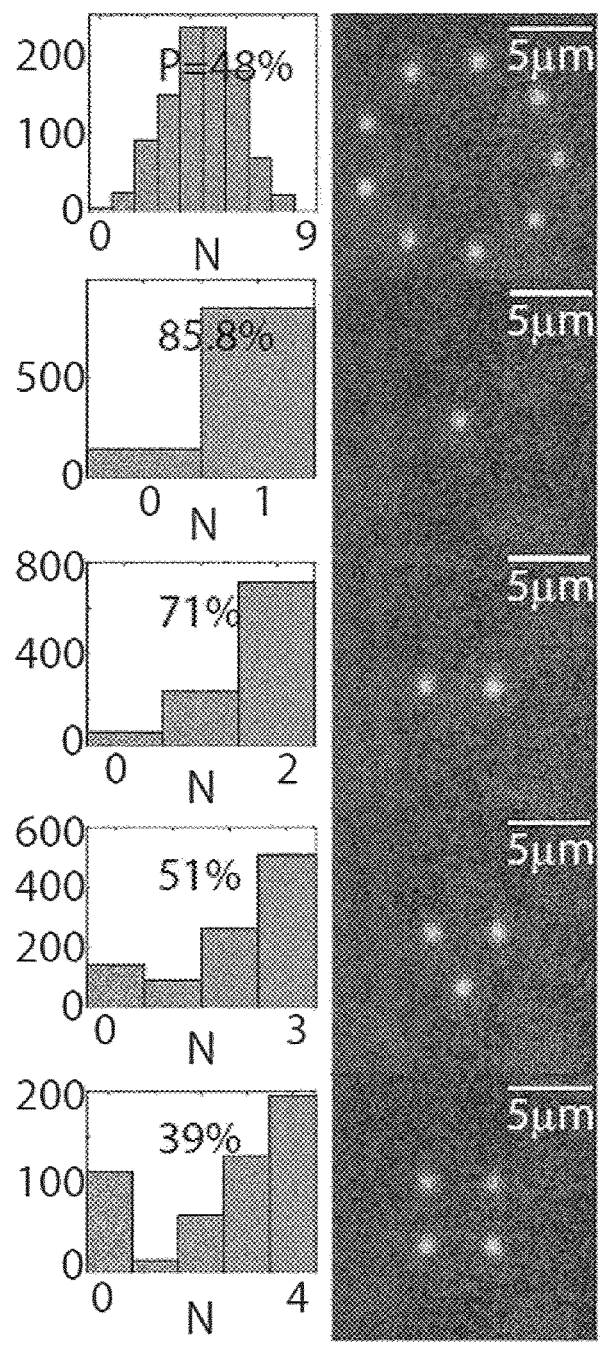
FIG. 6 is a view showing each of the final arrangements of one atom, two atoms, three atoms, and four atoms which are rearranged from first nine atoms (the uppermost part of the figure) by using the feedback of FIG. 5.
Figure 7:
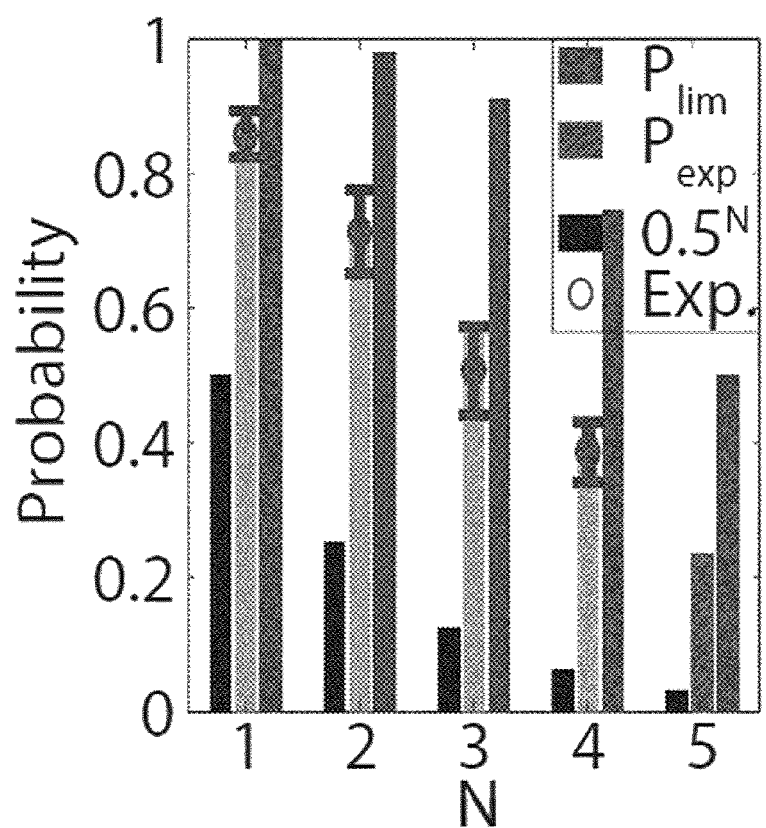
FIG. 7 is a graph showing a load efficiency of a finally formed array.

FIG. 6 is a view showing each of the final arrangements of one atom, two atoms, three atoms, and four atoms which are rearranged from the first nine atoms (the uppermost part of the figure) by using the feedback of FIG. 5. FIG. 7 shows a load efficiency curve of a finally formed array.

P_lim shown in FIG. 7 represents an expected theoretical value when no atom loss occurs in the loading of the array using the feedback. P_exp represents an experimental value. $0.5^N$ represents an expected low loading probability when no feedback occurs.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. An optically trapped atom transfer tweezer comprising:
an optical modulator configured to modulate incident light and to generate a first hologram;
a first lens configured to image the first hologram on an intermediate image plane and to generate a first holographic image having any potential shape;
a second lens configured to re-image the first holographic image on an entrance pupil of a third lens;
the third lens configured to re-image a second hologram generated by the re-imaging of the second lens on a plane where an optically trapped atom array exists;
a photographing device configured to capture optically trapped cold atoms from a second holographic image generated on the plane where the optically trapped atom array exists; and
a controller configured to control the optical modulator to adjust the second holographic image on a basis of an optically trapped atom image captured by the photographing device such that the optically trapped atom array is transferred to any spatial position.

2. The optically trapped atom transfer tweezer of claim 1, wherein the photographing device is an electron multiplying charge-coupled device (EMCCD).

3. The optically trapped atom transfer tweezer of claim 1, wherein the optical modulator is a liquid crystal spatial light modulator (LCSLM).

4. The optically trapped atom transfer tweezer of claim 1, wherein the optical modulator is comprised of an array of 1920×1080 pixels, each of which has a size of 8 µm².

5. The optically trapped atom transfer tweezer of claim 1, wherein a focal length of the first lens and a focal length of the second lens is 200 mm.

6. The optically trapped atom transfer tweezer of claim 1, wherein the third lens is an objective lens having a focal length of 4 mm.

7. The optically trapped atom transfer tweezer of claim 1, wherein the second holographic image has a beam radius $\omega_o$ of 1.14 µm, a trap depth U of 1.4 mK, and an optical power $P_0$ of 3.4 mW.

8. A method for transferring optically trapped atoms, the method comprising:
modulating incident light and generating a first hologram;
imaging, with a first lens, the first hologram on an intermediate image plane and generating a first holographic image having any potential shape;
first re-imaging, with a second lens, the first holographic image;
second re-imaging, with a third lens, a second hologram generated by the first re-imaging on a plane where an optically trapped atom array exists; and
capturing optically trapped cold atoms from a second holographic image generated on the plane where the optically trapped atom array exists.

9. The method of claim 8, further comprising adjusting the second holographic image on a basis of an optically trapped atom image generated by the capturing.

10. The method of claim 8, wherein the second holographic image has a beam radius $\omega_o$ of 1.14 µm, a trap depth U of 1.4 mK, and an optical power $P_0$ of 3.4 mW.

11. The optically trapped atom transfer tweezer of claim 1, wherein a focal length of the first lens is greater than a focal length of the third lens.

12. The optically trapped atom transfer tweezer of claim 1, wherein a focal length of the second lens is greater than a focal length of the third lens.

* * * * *